US008050713B2

(12) United States Patent
Ransom et al.

(10) Patent No.: US 8,050,713 B2
(45) Date of Patent: Nov. 1, 2011

(54) KEYPAD DISPLAY UNIT

(75) Inventors: Nathan Ransom, Rochester, NY (US); Thomas Warsaw, West Henrietta, NY (US); Mark Benoit, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1063 days.

(21) Appl. No.: 11/866,492

(22) Filed: Oct. 3, 2007

(65) Prior Publication Data

US 2009/0093220 A1    Apr. 9, 2009

(51) Int. Cl.
H04M 3/00    (2006.01)
H04M 1/00    (2006.01)
H04B 7/00    (2006.01)
H04B 1/38    (2006.01)
G08B 1/08    (2006.01)
B60R 25/10    (2006.01)
H04N 5/46    (2006.01)
H04N 5/44    (2011.01)

(52) U.S. Cl. ............ 455/557; 455/556.1; 455/420; 370/310; 340/539.1; 340/426.13; 348/729; 348/734

(58) Field of Classification Search ............ 455/418, 455/419, 420, 556.1, 557; 370/310; 340/426.13, 340/539.1, 539.11, 539.13, 539.14, 539.25; 348/729, 734
See application file for complete search history.

(56) References Cited

U.S. PATENT DOCUMENTS

| | | | |
|---|---|---|---|
| 5,544,959 A | 8/1996 | Collin et al. | |
| 6,844,846 B1 * | 1/2005 | Riday | 342/357.52 |
| 6,914,888 B1 | 7/2005 | Iselt et al. | |
| 7,139,562 B2 * | 11/2006 | Matsui | 455/420 |
| 7,177,623 B2 * | 2/2007 | Baldwin | 455/404.2 |
| 7,212,810 B2 * | 5/2007 | Babbar et | 455/414.1 |
| 7,397,346 B2 * | 7/2008 | Helal et al. | 340/309.16 |
| 2002/0093424 A1 | 7/2002 | Parry | |
| 2005/0197113 A1 * | 9/2005 | Lin et al. | 455/420 |
| 2006/0040638 A1 * | 2/2006 | McQuaide, Jr. | 455/403 |
| 2008/0242349 A1 * | 10/2008 | Rofougaran | 455/556.1 |

FOREIGN PATENT DOCUMENTS

WO    WO-0167315    9/2001

* cited by examiner

Primary Examiner — George Eng
Assistant Examiner — Wesley Kim
(74) Attorney, Agent, or Firm — Fox Rothschild, LLP; Robert J. Sacco

(57) ABSTRACT

A remote control panel (RCP) is provided for controlling an operation of a radio (104, 106). The RCP (102) includes a keypad (208) configured for receiving user input commands for controlling the radio using the same keypad commands as would be used when operating the same without the RCP. The RCP also includes a display unit (206) for displaying information concerning an operational state of the radio. The RCP further includes a communication interface (212, 312-316, 320-322) configured for relaying information from the RCP to the radio located a distance away. The interface is also configured for relaying information from the radio to the RCP. The RCP includes a computer processing device configured for providing an extended capability for the radio exclusive of a predefined functional capability. The extended capability is selected from the group consisting of additional digital data processing capability, additional display capability, and additional communication capability.

21 Claims, 5 Drawing Sheets

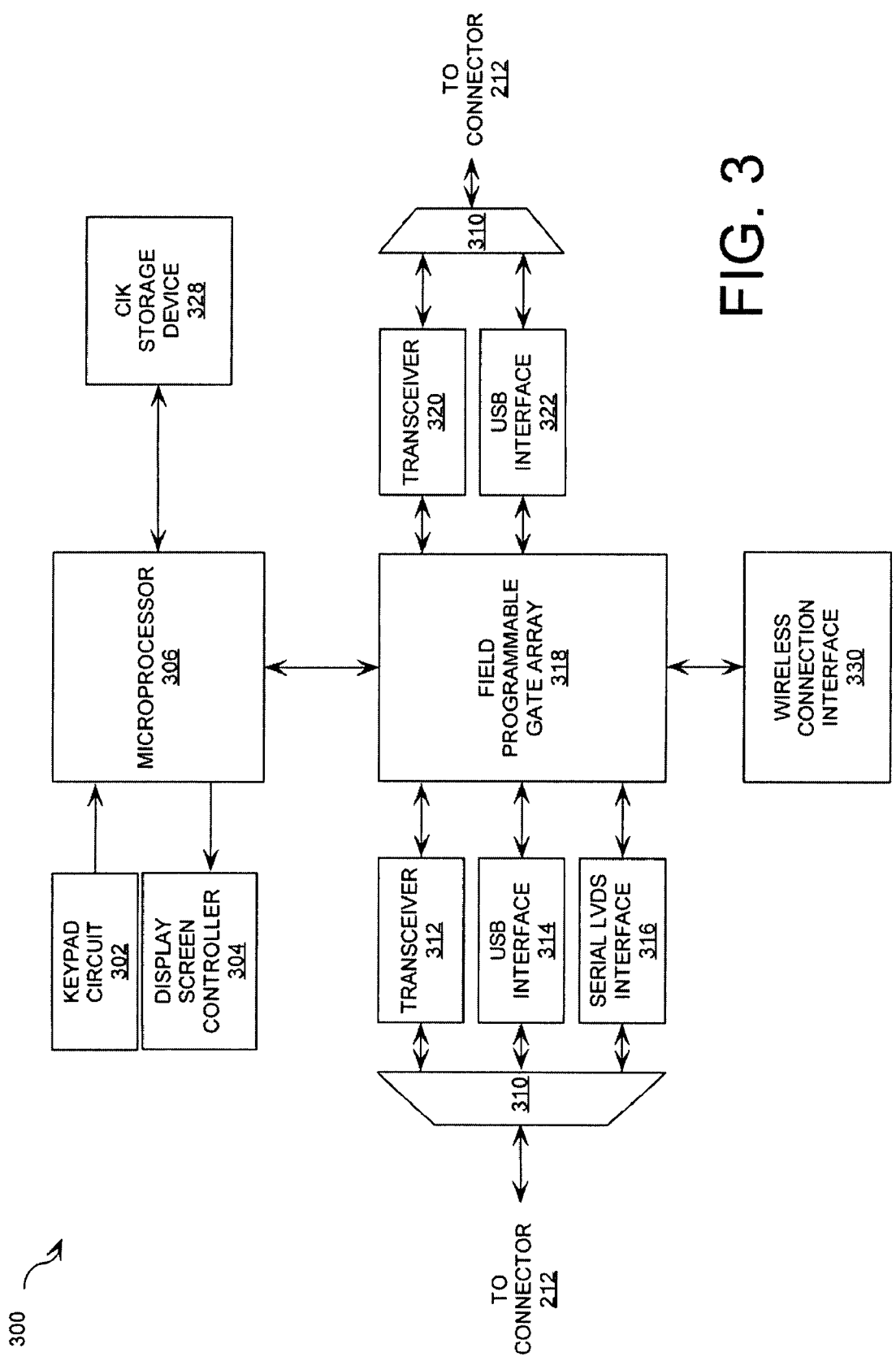

KEYPAD DISPLAY UNIT

BACKGROUND OF THE INVENTION

1. Statement of the Te Field

The invention concerns communications systems. More particularly, the invention concerns an advanced command and control external keypad display unit for concurrently controlling a plurality of radio devices, monitoring the radio devices and providing additional functionality to a user of the radio devices.

2. Description of the Related Art

Conventional communications systems are often comprised of a radio device and a keypad display unit. The keypad display unit is hereinafter referred to as "the KDU" or "the remote control panel". The radio device provides a means for wireless communications between communication devices existing within a defined area. The radio device can be a portable radio device. Alternatively, the radio can be a non-portable radio device. For example, the radio device can be mounted to a dashboard of a vehicle or securely coupled to holster. The holster can be designed for carrying the portable communications device on a person's shoulder, leg, back or chest.

The radio device is comprised of a casing, an internal circuitry, a user interface and an antenna. The casing provides a means for protecting the internal circuitry from damage due to an external factor, such as water and vibration forces. The internal circuitry and user interface provide a means for turning the radio device on/off, controlling a volume, selecting a frequency, setting a frequency, and transmitting a signal to another communications device. The antenna is mechanically coupled to the casing and electrically coupled to the internal circuitry. The antenna provides the means for the internal circuitry to transmit and receive RF signals.

The KDU is advantageously provided to enable the remote operation of the radio device. One can appreciate that such a remote operation configuration has many advantages. For example, the KDU enables the use of a radio device securely coupled to a holster or mounted in a fixed position within a vehicle. The KDU is configured to control the radio device and monitor the status of the radio device. In this regard, it should be appreciated that the KDU is electronically connected to the radio device via a cable.

The KDU is comprised of a casing, an internal circuitry, and a user interface. The casing provides a means for protecting the internal circuitry from damage due to an external factor, such as water and vibration forces. The internal circuitry and user interface provides a means for communicating with the radio device and controlling the radio device. More specifically, the KDU enables a user to adjust the volume, select a frequency, set various configuration options, transmit a signal to another communications device and listen to a received communications.

Despite the advantages of such a KDU, it suffers from certain drawbacks. For example, the KDU is not configured to: (a) concurrently control multiple radio devices; or (b) concurrently control a radio device and some other equipment. The KDU is also not configured to provide additional functionality to the radio device, such as a text messaging functionality, a streaming video functionality, a camera functionality, a web browsing and a global positioning system (GPS) map functionality.

In view of the forgoing, there is a need for an improved KDU for use with a plurality of radio devices. The KDU needs to be configured to: (a) concurrently control multiple radio devices; and/or (b) concurrently control a radio device and some other equipment. The KDU also needs to be configured to provide additional functionality to the radio devices, such as a text messaging functionality, a streaming video functionality, a camera functionality, a web browsing functionality and a global positioning system (GPS) map functionality.

SUMMARY OF THE INVENTION

A remote control panel (RCP) is provided for controlling an operation of a radio transceiver having a predefined functional capability. The RCP is comprised of a keypad, a display unit, a communication interface and a computer processing device. The keypad is configured to receive user input commands for controlling the radio transceiver using the same keypad commands as would be used when operating the radio transceiver without the RCP. The display unit is configured to display information concerning an operational state of the radio transceiver.

The communication interface is configured to relay information from the RCP to the radio transceiver located a distance away. The communications interface is also configured to relay information from the radio transceiver to the RCP. The information includes user input commands, state information concerning the operational state of the radio transceiver, transmit data to be transmitted by the radio transceiver, and receive data which has been received by the radio transceiver.

The computer processing device is configured to provide an extended capability for the radio transceiver exclusive of the predefined functional capability. The extended capability is selected from the group consisting of additional digital data processing capability, additional display capability, and additional communication capability. In this regard, it should be appreciated that the extended capability can be comprised of text messaging and/or an electronic map display with GPS positioning. The extended capability can also be comprised of a video display, a video decoder for decoding a video format, and/or a video encoder for encoding data from a video camera. The extended capability can further be comprised of a digital image encoder, a digital image decoder, a cipher ignition key and/or an internet web browsing capability.

According to an aspect of the invention, the RCP is further comprised of a user interface configured to receive second user input commands for controlling a second radio transceiver. The display unit is configured to display second state information concerning an operational state of the second radio transceiver. The communication interface is configured to relay second information from the RCP to the second radio transceiver located a second distance away. The communications interface is also configured to relay second information from the second radio transceiver to the RCP. The second information includes user input commands, information concerning the operational state of the radio transceiver, transmit data to be transmitted by the radio transceiver, and receive data which has been received by the radio transceiver.

According to another aspect of the invention, the communication interface is further configured to automatically switch between different communication protocols depending on operating conditions. The communication protocols are selected from the group consisting of USB, Serial LVDS, RS-232, and RS-422. According to yet another aspect of the invention, the communication interface is a wireless interface. The RCP is a personal digital assistant (PDA). The PDA supports commercial off-the shelf (COTS) operating system software, and COTS application software.

BRIEF DESCRIPTION OF THE DRAWINGS

Embodiments will be described with reference to the following drawing figures, in which like numbers represent like items throughout the figures, and in which:

FIG. 3 is a block diagram of the internal circuitry for the keypad display unit of FIG. 2 that is useful for understanding the present invention.

DETAILED DESCRIPTION OF THE PREFERRED EMBODIMENTS

Figure 1:
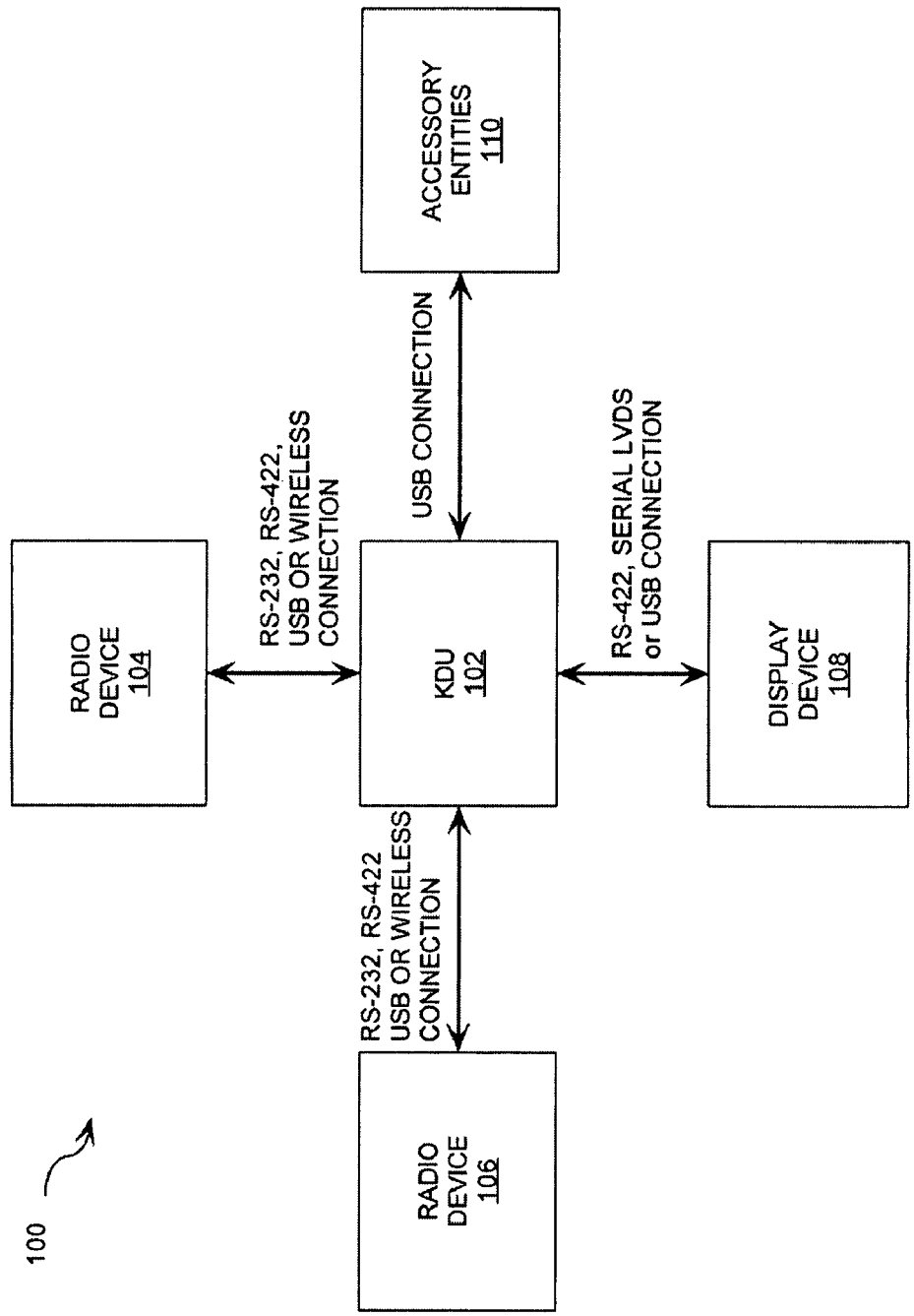
FIG. 1 is a block diagram of communications system that is useful for understanding the present invention.

Referring now to FIG. 1, there is provided a block diagram of communications system 100. The communications system 100 is comprised of a keypad display unit 102, radio devices 104, 106, a display device 108, and accessory entities 110. The keypad display unit 102 is hereinafter referred to as "the KDU" or "the remote control panel". It should be appreciated that each of the listed components 104, ..., 110 is well known to persons skilled in the art, and therefore will not be described in great detail herein.

However, it should be understood that the radio devices 104, 106 can be portable, hand held radio devices. Alternatively, the radio devices 104, 106 can be non-portable radio devices. In such a scenario, the radio devices 104, 106 can be mounted to a dashboard of a vehicle or securely coupled to a holster. The holster can be designed for carrying the portable communications device on a person's shoulder, leg, back or chest. The radio devices 104, 106 can be of the same type or different types. For example, the radio device 104 can be selected as a multi-band manpack radio. The radio device 106 can be selected as a vehicular radio system. Still, the invention is not limited in this regard.

The radio devices 104, 106 can be comprised of a global positioning system (GPS) unit (not shown) and GPS antenna (not shown). The GPS electronic devices (not shown) collectively provide a means for communicating GPS navigational data to another communication device, receiving GPS navigational data from another communications device, processing the GPS navigational data, and storing the GPS navigational data. It should be noted that the radio devices 104, 106 are absent of a GPS map functionality. It should also be noted that the radio device 104, 106 are also absent of a text messaging functionality, a streaming video functionality and web browsing functionality. Each of the listed functionalities is well known to persons skilled in the art, and therefore will not be described in great detail herein.

Referring again to FIG. 1, the display device 108 can be a heads up display device configured for projecting information onto a screen in a user's field of view or within a user's helmet. In this regard, it should be appreciated that the display device 108 enables the user to receive information while maintaining a clear view ahead. The accessory entities 110 include, but are not limited to, a camera, a flash memory data storage device, a video camera and a camcorder.

The KDU 102 is a handheld device advantageously provided to enable the concurrent and remote operation of a plurality of external devices 104, 106, 108, 110. One can appreciate that such a remote configuration has many advantageous. For example, the KDU 102 enables the remote use of one or more radio devices 104, 106 securely coupled to a holster. Similarly, the KDU 102 enables the remote use of one or more radio devices 104, 106 mounted in a fixed position within a vehicle. Still, the invention is not limited in this regard.

The KDU 102 is also a handheld device configured to support commercial off-the shelf (COTS) operating system and application software. Such handheld devices include, but are not limited to, personal digital assistants (PDAs). In this regard, it should be appreciated that the KDU 102 is configured to provide at least one of a GPS map functionality, a text messaging functionality, a streaming video functionality and a web browsing functionality to a user of an external radio device 104, 106. It should be noted that the KDU 102 is configured such that there is no requirement for hardware changes to the external radio device 104, 106 or substantial software changes to the external radio device 104, 106.

The KDU 102 is also configured to support instantaneous or nearly instantaneous switching between different types of connections. Such connections include, but are not limited to, a RS-232 connection, a RS-422 connection, a universal serial bus (USB) connection and a wireless communications link. Consequently, the KDU 102 can be connected to a variety of external devices. For example, the KDU 102 is connected to the radio device 104, 106, the display device 108 and the accessory entities 110. Still, the invention is not limited in this regard.

As shown in FIG. 1, the KDU 102 can be connected to each radio device 104, 106 using an interface cable over which data communications are performed between the KDU and each radio device. The interface cable and the connectors used on the KDU and radio device is advantageously configured to permit use of any one of a variety of communications protocols for implementing such data communications. For example, the various communications protocols can include without limitation RS-422, RS-232, USB, or a serial low voltage differential signaling (LVDS) connection. According to one aspect of the invention, a single common interface cable can be connected between the KDU 102 and each radio device 104, 106 for this purpose. In this regard, the interface cable and the connectors are preferably selected to have a sufficient number of pins and wire interconnections to facilitate any of such communications protocols. In this regard, it should be appreciated that the KDU 102 is preferably configured to automatically switch between different protocols for communicating with a particular radio device 104, 106 depending on the operating conditions of the same. The automatic protocol switching is performed in accordance with a method described in great detail below in relation to FIG. 4. As noted above, such protocols are selected from the group consisting of USB protocols, Serial LVDS protocols, RS-232 protocols and RS-422 protocols.

In addition to communications performed over a wired communication interface, the KDU 102 includes suitable hardware and software to implement one or more wireless data communications protocols. Such wireless data communications protocols can be used for providing data communications with the radio devices 104, 106 in place of a wired link. According to one embodiment, the wireless communications can be performed using a wireless network. The wireless network includes, but is not limited to, a wireless local area network (LAN), a wireless wide area network (WAN)

and/or a wireless personal area network (PAN). The wireless PAN can be a Bluetooth based PAN, an 802.11 based PAN, an 802.15.4 based PAN or any other wireless PAN. In such a scenario, the KDU 102 and the radio device 104, 106 can be comprised of transceivers (not shown) configured to enable communications between the two electronic devices. The electronic devices 102, 104, 106 can also be wireless WAN enabled devices, wireless LAN enabled devices, and/or wireless PAN enabled devices. Still, the invention is not limited in this regard.

Referring again to FIG. 1, the KDU 102 is also connected to the display device 108 through a RS-422 connection, a serial low voltage differential signaling (LVDS) connection or a USB connection. Likewise, the KDU is connected to the accessory entities 110 through one or more USB connections. In this regard, it should be appreciated that the KDU 102 is configured to act as a USB hub. The phrase "USB hub" as used herein refers a device that allows many USB enabled devices to be connected to a single USB port on the hub computer system. The KDU 102 has additional capabilities than that of a conventional USB hub. For example, a conventional USB hub is only configured to: (a) allow many accessory entities to be connected to a single USB port of the USB hub; and (b) utilize USB protocols for communicating with accessory entities coupled thereto. In contrast, the KDU 102 is configured to (a) allow many accessory entities to be connected to a single USB port on the KDU 102; (b) utilize USB protocols for communicating with accessory entities coupled thereto; (c) allow many radio device to be connected to a port of the KDU; and (d) utilize USB protocols, RS-232 protocols, RS-422 protocols and/or wireless protocols for communicating with radio devices coupled thereto.

Figure 2:
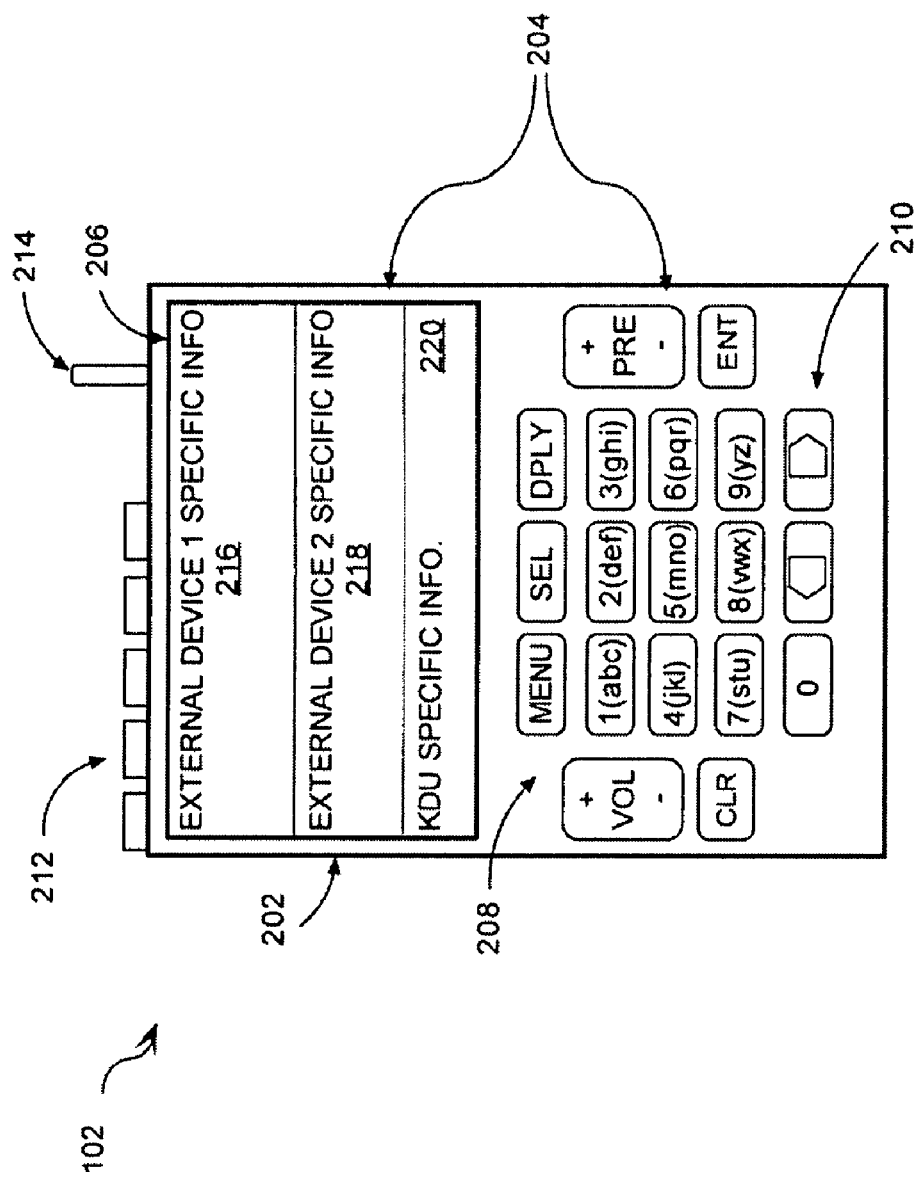
FIG. 2 is a front view of keypad display unit of FIG. 1 that is useful for understanding the present invention.

Referring now to FIG. 2, there is provided a front view of the KDU 102 shown in FIG. 1. The KDU 102 is comprised of a casing 202, internal circuitry (described below in relation to FIG. 3), a user interface 204, at least one connector 212 and an antenna 214. Each of the listed components is well known to persons skilled in the art, and therefore will not be described in great detail herein. However, it should be appreciated that the casing 202 provides a means for protecting the internal circuitry from damage due to an external factor. Such external factors include, but are not limited to, water and vibration forces.

The internal circuitry provides a means for communicating with external devices 104, 106, 108, 110. At least one connector 212 provides a means for physically connecting with an external device 104, 106, 108, 110 for enabling a RS-232 connection, a RS-422 connection or a universal serial bus (USB) connection. In this regard, it should be appreciated that the each connector 212 is: (a) mechanically coupled to the casing; (b) electrically coupled to the internal circuitry; and (c) configured to be electrically coupled to an external device 104, 106, 108, 110. It should also be appreciated that each KDU-to-radio device connection is via a multi-pin interface including a multi-pin connector and a cable.

According to an embodiment of the invention, the multi-pin connector is a custom seven (7) pin connector having a shield. In such a scenario, the KDU 102 is configured to support USB protocols, RS-422 protocols, and RS-232 protocols over the multi-pin interface. The USB protocols are well suited for use in situations where a cable length has a value less than five (5) meters. The RS-422 protocols are well suited for use in situations where a cable length has a value greater than five (5) meters and less than twelve hundred (1200) meters. The RS-232 protocols are provided primarily for those situations where a radio device is only RS-232 compatible. Each pin of the multi-pin connector has a pre-defined definition selected in accordance with the utilized protocol. For example, if the KDU 102 is utilizing the USB protocols to communicate with a radio device 104, then the pins of the multi-pin connector are defined as illustrated in column two (2) of the following Table 1. Similarly, if the KDU 102 is utilizing the RS-422 protocols to communicate with a radio device 104, then the pins of the multi-pin connector are defined as illustrated in column three (3) of the following Table 1. Likewise, the KDU 102 is utilizing the RS-232 protocols to communicate with a radio device 104, then the pins of the multi-pin connector are defined as illustrated in column four (4) of the following Table 1.

TABLE 1

| Multi-Pin Connector Pins | Pin Definitions Associated with USB Protocols | Pin Definitions Associated with RS-422 Protocols | Pin Definitions Associated with RS-232 Protocols |
| --- | --- | --- | --- |
| Pin #1 | Voltage Bus Pin | Voltage Bus Pin | Voltage Bus Pin |
| Pin #2 | Neg. Data Pin | Neg. Transmit Data Pin | — |
| Pin #3 | Pos. Data Pin | Pos. Transmit Data Pin | — |
| Pin #4 | Identification Pin | Identification Pin | Identification Pin |
| Pin #5 | Ground Pin | Ground Pin | Ground Pin |
| Pin #6 | — | Pos. Receive Data Pin | Receive Data Pin |
| Pin #7 | — | Neg. Receive Data Pin | Transmit Data Pin |

Still, the invention is not limited in this regard. There are several advantages associated with the foregoing arrangement The use of a single cable adapted for multiple communications protocols reduces the need for supplying many different cable types to support data communications under different operating conditions. The use of a single cable adapted for multiple communications protocols also facilitates the automatic communication protocols selection process described in relation to FIG. 4.

Referring again to FIG. 2, the antenna 214 is mechanically coupled to the casing and electrically coupled to the internal circuitry. The antenna provides the means for the internal circuitry to transmit and receive RF signals via a wireless connection. The user interface 204 is comprised of input devices, output devices, and software routines configured to allow a user to interact with and control software applications installed on the KDU 102 and/or an external device 104, 106, 108, 110. The user interface 204 can be comprised of a display screen 206, a keypad 208, a directional pad 210, a speaker (not shown), a directional knob (not shown), a microphone (not shown) and/or the like.

The user interface 204 is also advantageously configured to provide a common user interface for a plurality of external devices 104, 106, 108, 110. In this regard, it should be understood that the user interface 204 can be configured to display multiple views on the single display screen 206. At least one view can include information for a particular external device 104, 106, 108, 110 or the KDU 102. For example, the first view 216 displayed on the display screen 206 contains information for a first connected external device, such as the radio 104 described above in relation to FIG. 1. Similarly, a second view 218 displayed on the display screen 206 contains information for a second connected external device, such as the radio 106 described above in relation to FIG. 1. A third view 220 displayed on the display screen 206 contains information for the KDU 102. This information can include, but is not limited to, the type of each external device connected to the KDU 103, the number of external devices connected to the KDU 102, and the identities of the external devices having information displayed on a portion of the display screen 206. Still, the invention is not limited in this regard.

The user interface 204 can facilitate a user-software interaction for creating a request to access external devices 104, 106, 108, 110 and for communicating with the external devices 104, 106, 108, 110. The user interface 204 can also facilitate a user-software interaction for controlling any connected external device 104, 106, 108, 110 using the same or substantially similar keypad commands that would be used when operating the external device directly.

The software application of the user interface 204 can have a predefined menu system. Menu systems are well known to persons skilled in the art. Thus, menu systems will not be described in great detail herein. However, it should be understood that the menu system, input devices, and output devices can facilitate a user-software interaction for modifying contrast settings of the KDU 102, modifying display modes of the KDU 102 and/or modifying connection settings of the KDU 102.

The menu system, input devices, and output devices can also facilitate a user-software interaction for: adjusting the volume of a radio device 104, 106; selecting a frequency of the radio communications device 102, 106; setting a frequency of the radio communications device 102, 106; transmitting a signal to another communications device via a radio device 104, 106; listening to a communication received at a radio device 104, 106; and/or remotely projecting information onto a screen in a user's field of view or within a user's helmet.

The menu system, input devices, and output devices can further facilitate a user-software interaction for: entering a text message; obtaining streaming video of a surrounding environment using an external camera; viewing streaming video; viewing a global positioning system (GPS) map; taking a picture utilizing an external camera; and viewing a picture obtained by the external camera. The menu system, input devices, and output devices can facilitate a user-software interaction for: reading data from an external storage device; writing data to an external storage device; and/or performing web browsing activities.

Referring now to FIG. 3, there is provided a block diagram of the internal circuitry 300 of the KDU 102. As shown in FIG. 3, the internal circuitry 300 is comprised of a keypad circuit 302, a display screen controller 304, a microprocessor 306, and a crypto ignition key (CIK) storage device 328. The internal circuitry 300 is also comprised of a field programmable gate array (FPGA) 318, transceivers 312, 320, a universal serial bus (USB) interfaces 314, 322, a serial low voltage differential signaling (LVDS) interface 324, a wireless connection interface 330, and a system bus 310. Each of these listed components is well known to persons skilled in the art, and therefore will not be described in great detail herein.

However, it should be appreciated the microprocessor 306 is configured to perform actions for processing inputs from a keypad 208 (described above in relation to FIG. 2) and managing information to be displayed on a display screen 206 (described above in relation to FIG. 2). This management function includes, but is not limited to, providing display information and formatting display information. Such display information includes, but is not limited to, menu data and status data. The microprocessor 306 can also be configured to select a type of protocol for enabling communications between the KDU 102 and an external device 104, 106, 108, 110 based on an observed performance of a physical connection.

The FPGA 318 is configured to perform actions for supporting interfacing between the KDU 102 and external devices 104, 106, 108, 110. More specifically, the FPGA 318 is configured to perform actions for instantaneous or nearly instantaneous switching between the different types of connections. Such connections include, but are not limited to, a RS-232 connection, a RS-422 connection, a universal serial bus (USB) connection, a serial low voltage differential signaling (LVDS) connection and a wireless communications link. This switching can be achieved automatically based on the quality of the link between the KDU 102 and the external device 104, 106, 108, 110 that it controls. For example, if a relatively short cable is utilized to physically connect the external device 104, 106, 108, 110 and the KDU 102, then a high speed USB protocol is employed for enabling communications between the same. If a relatively long cable is utilized to physically connect the external device 104, 106, 108, 110 and the KDU 102, then a slower, more robust RS-422 protocol standard is employed for enabling communications between the same. It should be noted that the operation modes of the KDU 102 may be changed based on the link protocol employed. For instance, a video playback setting is adjusted to allow the KDU 102 to operate with a lower bandwidth of a relatively slow communication link. Still, the invention is not limited in this regard.

Referring again to FIG. 1, the FPGA 318 can be configured to select a type of protocol for enabling communications between the KDU 102 and an external device 104, 106, 108, 110 based on an observed performance of a physical connection. The FPGA 318 can also be configured to perform actions for receiving data streams from external devices 104, 106, 108, 110, processing the data streams, and forwarding data obtained from the data streams to the microprocessor 306.

It should also be appreciated that internal circuitry 300 is configured to support radio command applications and radio control applications. In this regard, the internal circuitry 300 can be configured to: (a) monitor the status of one or more external radio devices 104, 106; (b) adjust the volume of a radio device 104, 106; (c) select a frequency of the radio device 102, 106; (d) set a frequency of the radio communications device 102, 106; (e) transmit a signal including information to another communications device via a radio device 104, 106; and/or (f) receive a communication including information sent from another communications device to a radio device 104, 106. Such information can include, but is not limited to, voice data, video data, picture data, and global positioning system (GPS) data.

The internal circuitry 300 is further configured to support a crypto ignition key (CIK) application. The phrase "cipher ignition key" as used herein refers to an electronic device used to unlock a secure mode of crypto-equipment internal to a device 104, 106, 108, 110. In this regard, it should be appreciated that the CIK storage device 328 provides a means for securely storing crypto ignition key information. The CIK storage device 328 may be a non-volatile or a volatile storage device. If the CIK storage device 328 is a volatile storage device, then the internal circuitry 300 can include a battery (not shown) for powering the CIK storage device 328 when a primary power source (not shown) is disconnected from the internal circuitry 300 or is in a discharge state.

The internal circuitry 300 is further configured to support wireless communications links with external devices 104, 106. In this regard, it should be appreciated that the wireless connection interface 330 provides a means for wirelessly controlling a WAN, LAN, and/or PAN enabled external device 104, 106. Such a wireless configuration has many advantageous. For example, the wireless configuration is absent of physical connection constraints. Such physical connection constraints include, but are not limited to, the fixed number of physical connections to external devices and the relatively small fixed length of a cable.

The internal circuitry 300 can be configured to support a variety of commercial off the shelf (COTS) applications. Such COTS applications include, but are not limited to, read/write applications, text messaging applications, global positioning system (GPS) map applications, streaming video applications and web browsing applications. In regard to the read/write applications, the internal circuitry 300 can be configured to read data from an external data storage device (e.g., a flash memory data storage device) and write data to the external data storage device.

In regard to the text messaging applications, it should be appreciated that the microprocessor 306 can be configured to perform actions for accessing a text messaging application, running the text messaging application, generating a text message, and communicating the text message to another communications device via a radio device 104, 106.

In regard to the GPS map applications, the microprocessor 306 can be configured to perform actions for accessing a GPS map application, running the GPS map application, receiving GPS navigational data, writing GPS navigational data to a storage device, reading GPS navigational data from the storage device, reading GPS map data from the storage device, processing the GPS data, generating a GPS map identifying a geographic position, and displaying the GPS map to a user via a display screen 206 (described above in relation to FIG. 2).

In regard to the streaming video applications, the microprocessor 306 can be configured to perform actions for accessing a streaming video application, running the streaming video application, receiving streaming video data from an external device, decoding received streaming video data, processing the streaming video data and displaying a streaming video.

In regard to the web browsing applications, the microprocessor 306 can be configured to perform actions for accessing a web browsing application, running a web browsing application, displaying information (e.g., text and images) located in a web page at a website on a local area network or the World Wide Web, and allowing a user to interact with the displayed information.

The internal circuitry 300 can also be configured to support camera control applications. In this regard, the internal circuitry 300 can be configured to: (a) monitor the status of an external camera 110; (b) turn the camera 110 on/off; (c) adjust the settings of the camera 110; (d) take a picture utilizing a camera 110; (e) display pictures taken by a camera 110; and (f) store data for a picture in an internal and/or external data storage device.

It should be noted that the KDU 102 can further include a battery (not shown) for powering some or all of its internal circuitry 300 (described below in relation to FIG. 3) and user interface 204 (described above in relation to FIG. 2). In addition to or as an alternative to the battery, the internal circuitry 300 and the user interface 204 can be powered by a power source internal to a radio device 104, 106 or vehicle. In such a scenario, a physical connection to a radio device 104, 106 can be provided that electrically connects the KDU 102 to a power source internal to the radio device 104, 106. Similarly, a physical connection to the vehicle can be provided that electronically connects the KDU 102 to a power source internal to the vehicle.

Figure 4A:
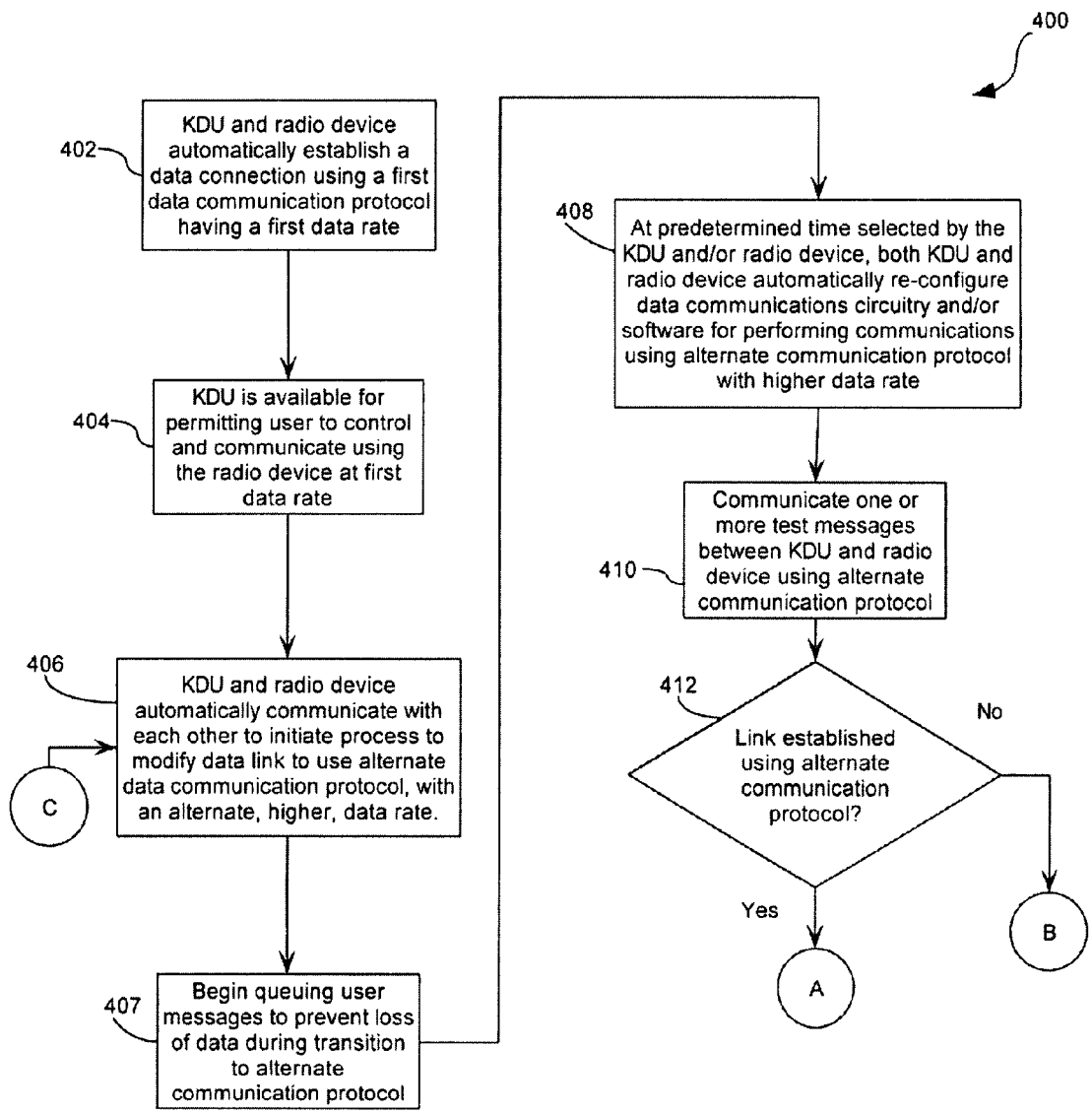
FIG. 4 is a flow diagram of a method for automatically switching between different protocols for communicating with a radio device that is useful for understanding the present invention.
Figure 4B:
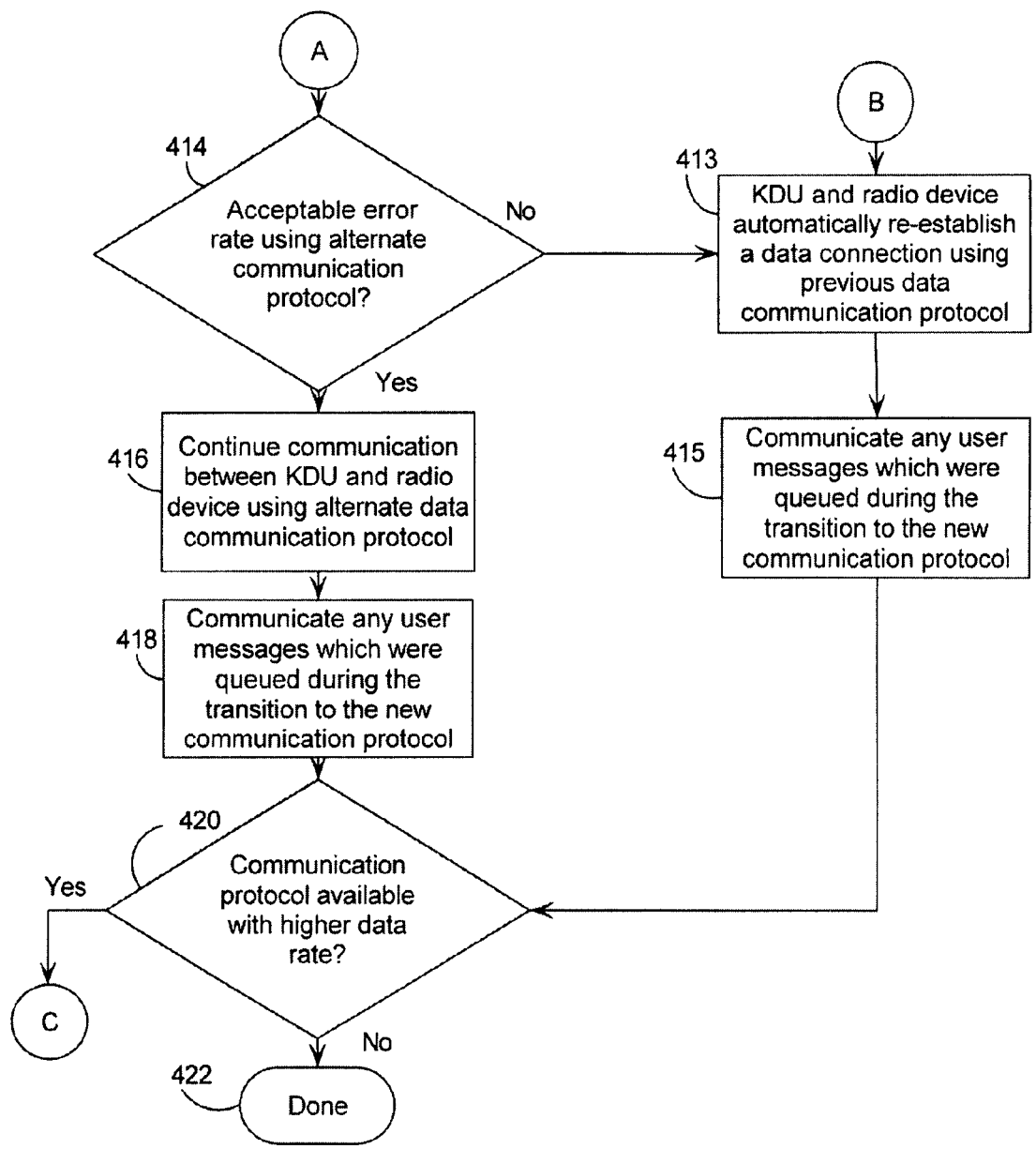

Referring now to FIG. 4, there is provided a flow diagram of a method 400 for automatically switching between different protocols for communicating with a radio device 104, 106 over a wired communication link. It should be appreciated that this method is applicable to situations where a KDU 102 is physically connected to a radio device 104, 106. For convenience, the flow diagram of FIG. 4 shows the process for a single radio device 104. However, it should be understood that the same process can be performed for multiple radio devices 104, 106.

As shown in FIG. 4, the method 400 begins at step 402 when the KDU 102 and the radio device 104 automatically establish a data communications session using a first data communication protocol having a first data rate. According to one embodiment of the invention, the first data communication protocol can simply be a data communication protocol corresponding to the lowest data rate. For example, this data communication protocol could be a conventional RS-422 at 100 kilo-bits per second. The advantage of this selection for the first data communication protocol is that it is guaranteed to provide a functional communication link, provided that the cable length is less than 1200 meters. As indicated in step 404, the KDU is now available to facilitate user control and communications with the radio device 104. However, communications between the KDU 102 and the radio device 104 will be relatively slow and can lead to decreased performance during periods including high rates of data traffic. Accordingly, the process continues to step 406

In step 406, the KDU 102 and the radio device 104 communicate with each other to initiate a process for modifying the data link. In particular, the two devices can initiate a process to use an alternate data communication protocol with an alternate, higher, data rate. In step 406, any suitable set of notifications and acknowledgments can be used for initiating the transition to an alternate data communication protocol. For example, such notifications and acknowledgments can include a notification regarding a proposed change in data communication protocol, the alternate protocol which is being proposed, and when the change to the alternate data protocol is to occur.

The alternate data communication protocol proposed in step 406 can be selected in a variety of different ways. According to one embodiment, the alternate communication protocol selected can be the one with the next higher data rate compared to the first data communication protocol. Alternatively, the protocol with the fastest data rate can be selected for the alternate communication protocol. For example, an attempt can be made to use a USB type data communication protocol at 480 Mbps (the fastest link possible). As a further alternative, a medium data rate communication protocol could be selected. A binary search algorithm can be used to reduce the time needed to find the fastest usable data communications protocol.

In an alternative embodiment, the KDU can also have a memory device or data store in which it can store information regarding the communication protocol and/or data rate that was last used in a previous data communication session. In that case, the alternate data communication protocol selected in step 406 can be the data rate that was last used in a previous data communication session. This can reduce the time necessary to establish the highest speed link possible, since it will usually be the case that the KDU is connected to the radio device 104 using the same cable connections as the previous time that the KDU was used.

In step 407, user messages are queued in a buffer or other suitable memory device to prevent loss of data during the transition to the new data communication protocol. Thereafter, in step 408, at a predetermined time established by the KDU 102 and/or radio device 104, both KDU and radio device automatically reconfigure their data communication circuitry and/or software for performing communications using the alternate communication protocol with the higher data rate.

In step 410, the process continues with the communication of one or more test messages between the KDU 102 and/or radio device 104. These test messages are sent using the alternate communication protocol implemented in step 408. In step 412, a determination is made as to whether a link has been established using the alternate communication protocol. If not, then the process continues to step 413 where the KDU 102 and the radio device 104 revert to the previous communication protocol. For example, the KDU and the radio device 104 can again automatically establish a data communication session using the first data communication protocol at the first data rate. In step 415, any user messages that were queued during the attempt to use the alternate communication protocol can now be communicated using the previous communication protocol. Such user messages can include data communications from the KDU to the radio device and/or from the radio device to the KDU. Note that the communication of these messages ensures that the process of attempting to use an alternative communication protocol does not adversely interfere with the operation of the KDU and the radio device. After step 415, the process continues with step 420. In step 420, a determination can be made as to whether an alternative communication protocol is available at a higher data rate. If so, the process can return to step 406 to initiate another transition to a higher data rate. Otherwise, the process can terminate in step 422.

Alternatively, if a link is successfully established in step 412, the process can continue on to step 414 where a determination is made as to whether an acceptable error rate has been achieved using the alternate communication protocol. For example, it can be determined whether the alternate communication protocol provides error free communication. If not, then the process can continue on to step 413 as described above. Otherwise, the process can continue to step 416.

In step 416, communications continue between the KDU and radio device using the alternate data communication protocol and the higher data rate. In step 418, any user messages that were queued during the transition to the alternate communication protocol can now be communicated using the alternate communication protocol. Such user messages can include data communications from the KDU to the radio device and/or from the radio device to the KDU. Note that the communication of these messages ensures that the process of selecting an alternative communication protocol does not adversely interfere with the operation of the KDU and the radio device.

In step 420, a determination can be made as to whether an alternative communication protocol is available at a higher data rate. If so, the process can return to step 406 to initiate another transition to a higher data rate. Otherwise, the process can terminate in step 422.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A remote control panel for controlling an operation of a radio transceiver having a predefined functional capability, comprising:
a keypad configured for receiving user input commands for remotely controlling a plurality of electronic devices including at least one radio transceiver;
a display unit for displaying information concerning an operational state of said radio transceiver;
a communication interface configured for relaying control information from said remote control panel to said radio transceiver, and for relaying status/receive information from said radio transceiver to said remote control panel, said control information including said user input commands and transmit data to be transmitted by said radio transceiver, said status/receive information including state information concerning said operational state of said radio transceiver and receive data which has been received by said radio transceiver;
said remote control panel also including at least one computer processing device configured for providing an extended capability for said radio transceiver exclusive of said predefined functional capability, said extended capability selected from the group consisting of additional digital data processing capability, additional display capability, and additional communication capability;
wherein said communication interface comprises a plurality of interface cable connector ports, each configured to facilitate a wired connection to one of said plurality of electronic devices, and each having a sufficient number of wire interconnections to facilitate data communications to and from a respective one of said plurality of electronic devices using any one of a plurality of communication protocols selected from the group consisting of USB, Serial LVDS, RS-232, and RS-422, said communication interface further configured to automatically switch between said plurality of communication protocols while using the same cable connector port; and
wherein said display unit is configured for displaying concurrently with said operational state of said radio transceiver, second state information concerning a second operational state of said second electronic device.

2. The remote control panel according to claim 1, wherein said extended capability comprises text messaging.

3. The remote control panel according to claim 1, wherein said extended capability comprises an electronic map display with GPS positioning.

4. The remote control panel according to claim 1, wherein said extended capability comprises a video display.

5. The remote control panel according to claim 1, wherein said extended capability comprises a video decoder for decoding at least one video format.

6. The remote control panel according to claim 1, wherein said extended capability comprises a video encoder for encoding data from at least one video camera.

7. The remote control panel according to claim 1, wherein said extended capability comprises a digital image encoder.

8. The remote control panel according to claim 1, wherein said extended capability comprises a digital image decoder.

9. The remote control panel according to claim 1, wherein said extended capability is a cipher ignition key.

10. The remote control panel according to claim 1, wherein said extended capability is an internet web browsing capability.

11. The remote control panel according to claim 1, wherein said communication interface is further configured for relaying second control information from said remote control panel to said second radio transceiver located a second distance away, and for relaying second status/receive information from said second radio transceiver to said remote control panel.

12. The remote control panel according to claim 11, wherein said second control information includes said user input commands, and transmit data to be transmitted by said second radio transceiver, and said second status/receive information includes information concerning said operational state of said second radio transceiver, and receive data which has been received by said second radio transceiver.

13. The remote control panel according to claim 1, wherein said communication interface further comprises a wireless interface.

14. The remote control panel according to claim 1, wherein said communications interface is configured to automatically select a data transfer protocol which permits a highest data transmission rate for an existing communications link provided between said remote control panel and said radio transceiver.

15. The remote control panel according to claim 1, wherein said one or more interface cable connector ports is a plurality of interface cable connector ports which are communicatively coupled together to form a USB hub.

16. A remote control panel for controlling an operation of a plurality of radio transceivers, each having a predefined functional capability, comprising:
 a keypad configured for receiving user input commands for controlling a plurality of radio transceivers;
 a display unit for concurrently displaying information concerning an operational state of said plurality of radio transceivers;
 a communication interface configured for relaying control information from said remote control panel to each said radio transceiver, and for relaying status/receive information from each said radio transceiver to said remote control panel, said control information including said user input commands and transmit data to be transmitted by each said radio transceiver, said status/receive information including state information concerning said operational state of each said radio transceiver and receive data which has been received by each said radio transceiver;
 said remote control panel further comprising at least one computer processing device configured for providing an extended capability for said plurality of radio transceivers exclusive of said predefined functional capability, said extended capability selected from the group consisting of additional data processing capability, additional display capability, and additional communication capability; and
 wherein said communication interface comprises a plurality of interface cable connector ports, each configured to facilitate a wired connection to one of said plurality of radio transceivers, and each having a sufficient number of wire interconnections to facilitate data communications to and from said radio transceiver using any one of a plurality of communication protocols selected from the group consisting of USB, Serial LVDS, RS-232, and RS-422, said communication interface further configured to automatically switch between said plurality of communication protocols while using the same cable connector port.

17. The remote control panel according to claim 16, wherein said extended capability is an internet web browsing capability.

18. The remote control panel according to claim 16, wherein said communications interface is configured to automatically select a data transfer protocol which permits a highest data transmission rate for an existing communications link provided between said remote control panel and said radio transceiver.

19. The remote control panel according to claim 16, wherein said plurality of interface cable connector ports are communicatively coupled together to form a USB hub.

20. A remote control panel for controlling an operation of a plurality of radio transceivers, each having a predefined functional capability, comprising:
 a keypad configured for receiving user input commands for controlling a plurality of radio transceivers;
 a display unit for concurrently displaying information concerning an operational state of said plurality of radio transceivers;
 a communication interface configured for relaying control information from said remote control panel to each said radio transceiver, and for relaying status/receive information from each said radio transceiver to said remote control panel, said control information including said user input commands and transmit data to be transmitted by each said radio transceiver, said status/receive information including state information concerning said operational state of each said radio transceiver and receive data which has been received by each said radio transceiver;
 said remote control panel providing also comprising at least one computer processing device configured for providing an extended capability for said plurality of radio transceivers exclusive of said predefined functional capability, said extended capability selected from the group consisting of additional data processing capability, additional display capability, and additional communication capability;
 wherein said remote control panel supports commercial off-the shelf operating system software and application software; and
 wherein said communication interface comprises a plurality of interface cable connector ports, each configured to facilitate a wired connection to one of said plurality of radio transceivers, and each having a sufficient number of wire interconnections to facilitate data communications to and from said radio transceiver using any one of a plurality of communication protocols selected from the group consisting of USB, Serial LVDS, RS-232, and RS-422, said communication interface further configured to automatically switch between said plurality of communication protocols while using the same cable connector port.

21. The remote control panel according to claim 20, wherein said plurality of interface cable connector ports are communicatively coupled together to form a USB hub.

* * * * *